United States Patent [19]
Pryor

[11] Patent Number: 4,839,526
[45] Date of Patent: * Jun. 13, 1989

[54] COORDINATE MEASURING METHOD AND DEVICE

[75] Inventor: Timothy R. Pryor, Tecumseh, Canada

[73] Assignee: Diffracto Ltd., Windsor, Canada

[*] Notice: The portion of the term of this patent subsequent to Jun. 5, 2001 has been disclaimed.

[21] Appl. No.: 92,361

[22] Filed: Sep. 2, 1987

Related U.S. Application Data

[60] Continuation of Ser. No. 831,724, Feb. 21, 1986, Pat. No. 4,594,184, Division of Ser. No. 592,028, Mar. 22, 1984, Pat. No. 4,583,000, Continuation of Ser. No. 207,081, Nov. 14, 1980, Pat. No. 4,453,082.

[51] Int. Cl.$^4$ .............................................. G01N 21/86
[52] U.S. Cl. .................................................. 250/561
[58] Field of Search ............... 250/227, 561, 221, 222, 250/560, 202; 356/1, 4, 376; 340/555, 556, 557

[56] References Cited

U.S. PATENT DOCUMENTS

| | | | |
|---|---|---|---|
| 3,355,590 | 11/1967 | Bertram | 250/202 |
| 3,476,948 | 11/1969 | Mengers | 340/555 |
| 3,692,414 | 9/1972 | Hosterman et al. | 356/4 |
| 4,042,823 | 8/1977 | Decker et al. | 250/227 |
| 4,160,199 | 7/1979 | Bardwell | 250/202 |
| 4,325,640 | 4/1982 | Dreyfus et al. | 356/1 |
| 4,453,082 | 6/1984 | Pryor | 250/561 |

Primary Examiner—David C. Nelms
Attorney, Agent, or Firm—Larson and Taylor

[57] ABSTRACT

A method and device for sensing the presence and location of an object in a reference plane by directing light along a line prependicular to the plane, defining a ring in that plane encircling said line of light, and sensing, by a change in the condition of the light, the presence of an object on the ring. In a first, non-contacting embodiment, light is directed along a line which is the axis of the ring and directed outwardly and focused at the ring. A circular detector coaxial with the light ring is positioned to sense intrusion onto that ring of an object, and by using a circular diode array detector, one can detect both the presence and location of that object on the ring. According to another contacting embodiment, a disc is placed in the reference plane with the light shining through an opening therein, the disc being movable in any direction in said reference plane. When an object touches the disc at any point and moves it, this changes the location of the aperture through which the light passes. This change is sensed to indicate an object on the ring.

17 Claims, 4 Drawing Sheets

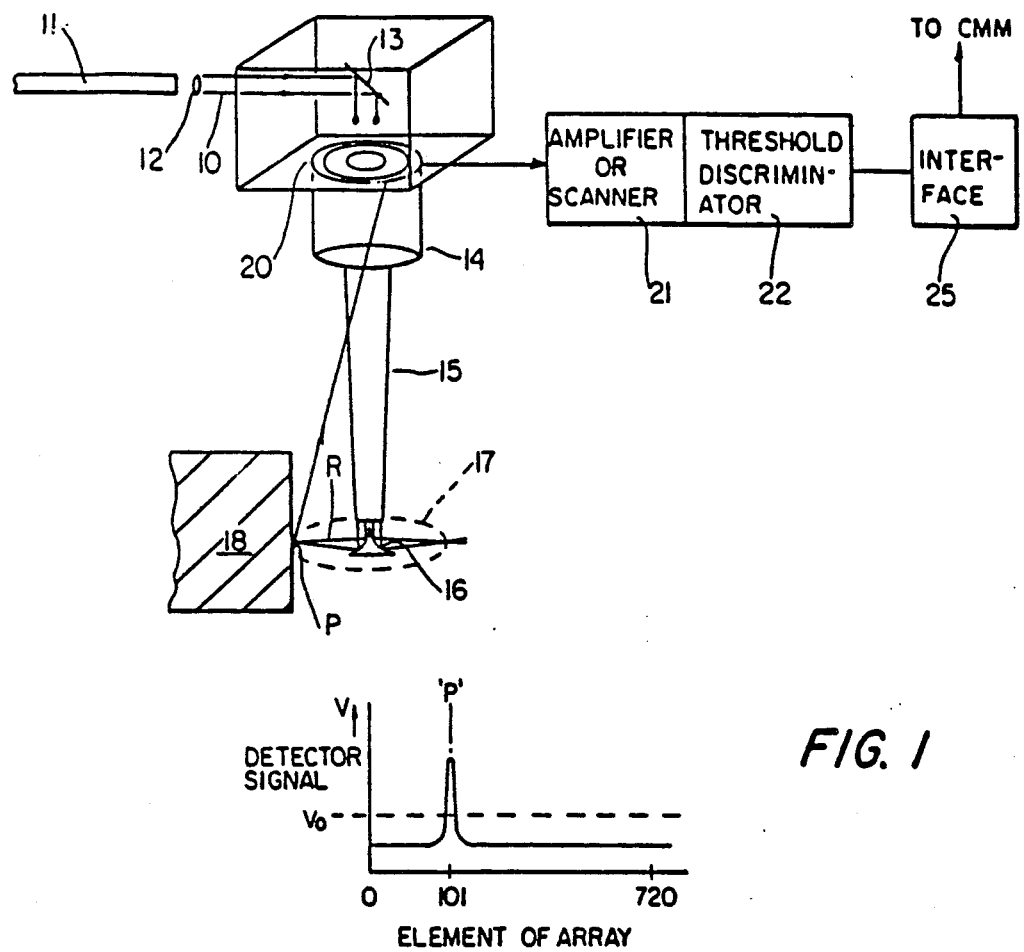
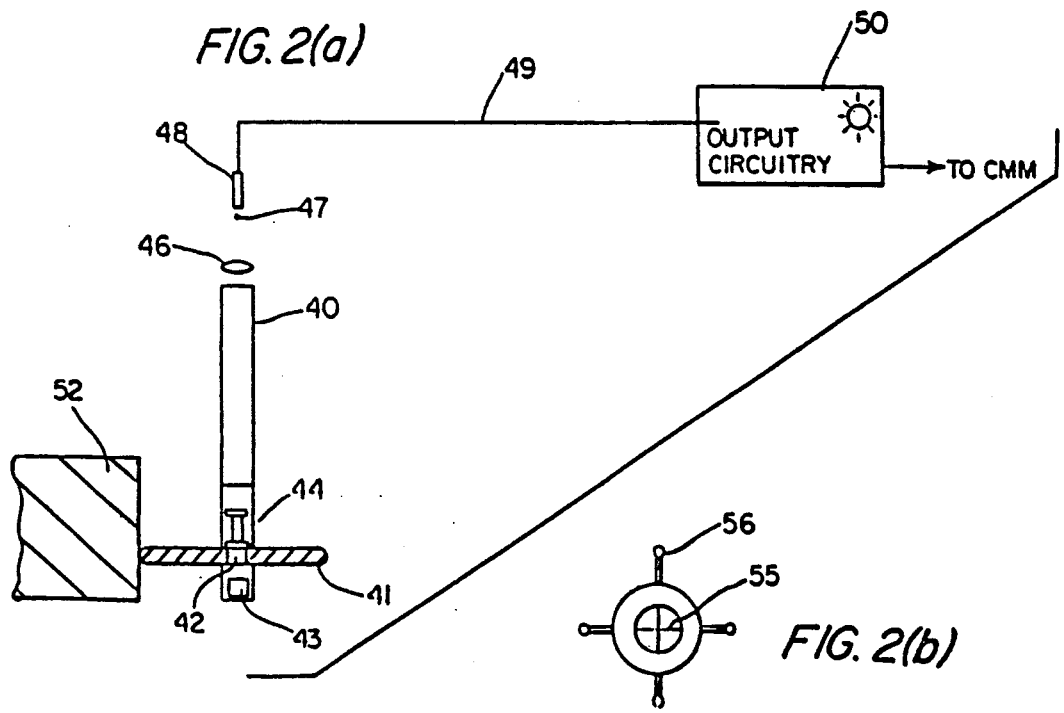

COORDINATE MEASURING METHOD AND DEVICE

This is a continuation of application Ser. No. 831,724, filed Feb. 21, 1986, now U.S. Pat. No. 4,594,184, which was a division of Ser. No. 592,028, filed Mar. 22, 1984, now U.S. Pat. No. 4,583,000, which was a continuation of Ser. No. 207,081, Filed Nov. 14, 1980, now U.S. Pat. No. 4,453,082.

BACKGROUND OF THE INVENTION

This invention relates to a coordinate measuring method and apparatus, and in particular, it relates to such a device using optical sensing means.

Existing coordinate measuring machines utilize a mechanical probe known as the Renishaw probe. However, the known probes are expensive, slow (because they must contact the surface or part being sensed), prone to breakage (again, because they must contact the part being sensed) and inaccurate in certain applications.

In general, the problem with respect to a coordinate measuring machine is to move the mechanical arm, the encoded coordinates of which are used to perform the measurement, and to move the probe into a position such that it can register against some feature of the part being sensed such as a bore wall, a flange face, etc. To this end, a considerable number of probes have been used heretofore, one example typified by that shown in U.S. Pat. No. 4,177568. However, the standard probe in the industry for measuring coordinates remains the Renishaw probe.

Hence, there exists a need for a coordinate measuring means which overcomes the disadvantages present in previous coordinate measuring machines.

SUMMARY OF THE INVENTION

The purpose of the present invention is to provide a method and probe device for coordinate measurements which uses optics and senses the presence or the presence and location of an object by directing a light along a line perpendicular to the reference plane of measurement and senses a change in the condition of that light.

In accordance with a first embodiment of the invention, a non-contacting method and coordinate measuring probe are provided. In this embodiment light is directed along a line and then deflected outwardly into a reference plane whereat it focuses on a circle in the reference plane. A circular detector is so arranged that it senses whether any object has interrupted the ring defined by the focused circle of light. If the circular detector is a circular diode array, then the device can sense not only the presence of the object interrupting the light ring, but also the precise location thereof.

In another embodiment, this one involving contact with the part being sensed, light is also directed along a line perpendicular to a reference plane. A circular disc is located in the plane with the light passing through a small opening in the center thereof. This disc is permitted to move in any direction in said reference plane, and in operation if any object engages the disc and moves it, it moves the small opening off of center, thereby changing the characteristics of the light shining therethrough. This change is sensed and indicates the presence of an object on the ring defined by the periphery of the disc.

Hence, it is an object of the present invention to provide a new and improved coordinate measuring device.

It is another object of this invention to provide a new and improved method for coordinate measurement.

It is still another object of this invention to provide a new and improved coordinate measuring method and device which employs optical means.

It is another object of this invention to provide a new and improved coordinate measuring method and apparatus in which a ring is defined in a reference plane, light is directed along the axis of that ring, and the change in condition of that light is used to sense the presence or both the presence and location of an object intersecting the ring.

It is still another object of the present invention to provide a new and improved optical coordinate measuring device and method which senses the presence or the presence and location of an object in a reference plane solely through the use of optical means without contacting the object.

It is still another object of the present invention to provide a new and improved coordinate measuring device and method using optical means and having a part which contacts the object being sensed, but which is highly simplified relative to previous coordinate measuring machines.

These and other objects of the present invention will become apparent from the detailed description to follow, taken together with the accompanying drawings.

BRIEF DESCRIPTION OF THE DRAWINGS

There follows a detailed description of the preferred embodiments of the present invention which are to be read together with the accompanying drawings wherein:

FIG. 1 is a schematic view illustrating a first embodiment of the present invention.

FIG. 2(a) is a schematic view illustrating a second embodiment of the present invention and FIG. 2(b) is detail of FIG. 2(a).

DETAILED DESCRIPTION OF THE PREFERRED EMBODIMENTS

Figure 3:
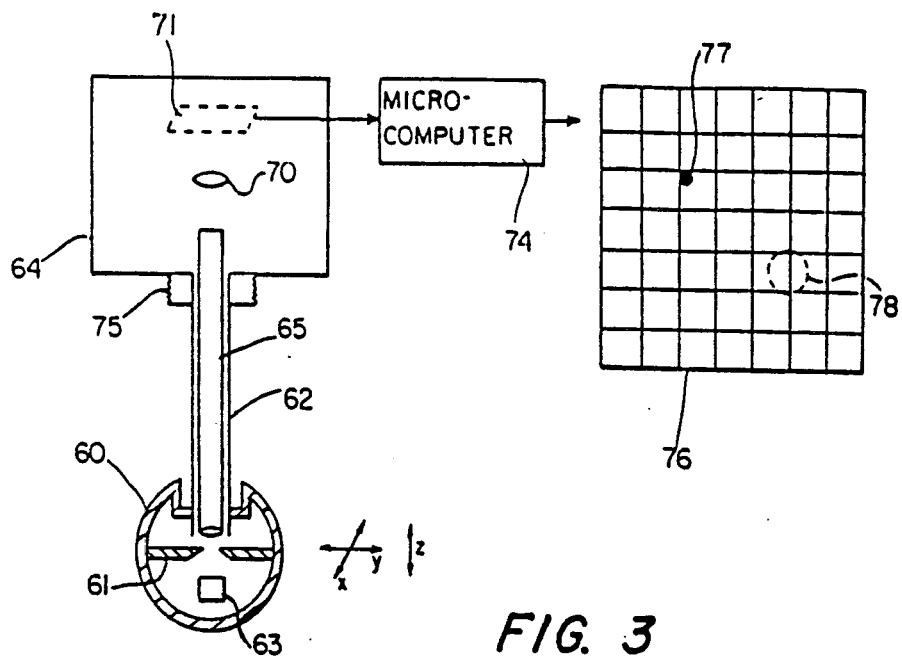
FIGS. 3, 4a, 4b, 5, 6 and 7 illustrate other embodiments of the invention.

FIG. 1 illustrates a first embodiment of the invention. In this embodiment the light means defines a "ring" in space which has no physical presence but which exists as an optically sensitive entity. When this ring, at any point in its 360° comes in contact with an object, a signal is generated which represents the presence and location, i.e. the coordinate of that object on the ring. In commonly owned copending application Ser. No. 15,792, now U.S. Pat. No. 4,305,661, there is shown (in FIG. 17) an optical probe for detecting conditions on the wall of a bore, and wherein light was directed along the bore and then at a reference plane reflected outwardly to the inside wall of the bore. The present invention is an improvement of the device shown in said pending application, specifically an improvement including means for defining a ring and sensing the presence and location of an object intersecting that ring.

Referring to FIG. 1, a laser beam 10 emanating from the end of a wave guide fiber 11 (for example Nippon Sheet Glass Company "Selfoc Long Laser Guide", diameter 0.75 mm, length one meter). The laser beam, after being focused and imaged in a collimated manner by lens 12 is reflected by diverting mirror 13 down through a lens 14 and cylindrical glass tube 15 onto an inverted parabolic or conical mirror 16 from which it is reflected and focused outwardly along a ring 17 located in a reference plane perpendicular to the axis of the light beam through glass tube 15.

As shown in FIG. 1, one point P on the ring 17 happens to coincide with a wall of part 18. In this condition the device would sense the presence of the wall 18 at point P.

Light at the point P is reflected upwardly and imaged by the same lens 14 through which the light originally passed onto a detector ring 20. Detector ring 20 can be a solid ring or preferably a circular diode array. In the case of a solid ring, the detector signal is fed to the amplifier 21, threshold discriminator 22 and the resulting trip signal is sent to the coordinate measuring machine by interface 25. The solid ring senses the location of the light in the following manner.

If the part is indeed present at the point P, light reaches the solid ring and a part present signal is detected. The co-ordinate location of the part is then determined by reading the xy location of the probe in space from machine scales (not shown) well known in the art.

If the part is located to the left of point P, in the drawing, the probe is moved to the left until the light is detected on the ring. At this time, the scale data is "locked-up", or registered, even though the machine can keep moving i.e. over travel.

It is noted again that point P can be anywhere 360° and is then the first such object point registered in a given movement. Use of the circular array, however, allows other points to be measured as well as the direction of contact.

If the detector ring is instead a circular photo diode array, the diode would be scanned by a scanning circuit 21. The scanning would take place at a rate of up to several hundred to a thousand scans per second depending on the light level and on the output of the array as analyzed by the threshold circuit 22. Threshold circuit 22 would look for "blips" indicative of contact with the part surface and when one appeared its location and the fact that it has appeared at a given monent would be indicated at the interface 25.

In the illustrated embodiment, the lens 14 is shown performing the dual functions of helping to collimate or focus the incoming laser beam and then imaging the return light. Alternatively, the lens 14 could have an opening through the center thereof in which case it would serve no purpose for the incoming light but would still serve to image the light returning from the part 18 to the detector ring. In any case, the selection of the lenses 12 and 14 plus the curvature of the mirror 16 would all be chosen so as to form the focused light ring at a distance R as desired.

The embodiment of FIG. 1 is subject to a number of different variations. For example, rather than utilizing a remote laser beam, one can have the laser located in place of the fiber 11. Alternatively, a diode laser or conceivably an LED light could be placed in the cylindrical glass tube 15 itself or at the position of the mirror 13.

The device illustrated and described above is totally responsive to intrusions onto the ring from any direction and has all the capability of normal coordinate probes with the exception that it cannot respond in the vertical direction (as viewed in FIG. 1), at least in the embodiment as illustrated and described. However, this embodiment can be modified by additional optical or mechanical means to provide the vertical sensing. For example, if the entire sensor unit was mounted on a strainable diaphragm located in the plane of the detector ring or the plane of the lens 14 the strains in this diaphragm could indicate a vertical or "Z" axis deflection. Of course if the device shown at FIG. 1 were used in such a manner that the lower end of the probe would contact a surface, it would be desirable to put a ball contact at the end of the probe rather than the flat edge as shown in FIG. 1.

As an alternative, rather than sense the returning light and delivering the same to elements 21, 22 and 25, given the flexibilities of image transmission through wave guide fibers, particularly when monochromatic light is used, it is within the scope of this invention to transmit the reflected light from the ring back through the same fiber 11 or a different fiber to allow the sensing of the light ring image to be performed at a remote location.

The embodiment of FIG. 1 would operate as follows. The laser beam 10 would be directed from the laser down the axis of the probe device through the cylindrical glass tube 15 where it would hit the inverted parabolic mirror 16 which could actually be a cone type mirror as well as a parabolic mirror. The mirror would deflect the light outwardly and focus it as a nominal radius R from the probe axis. This focusing effect would occur for the full 360° around the said axis in what has been defined as a reference plane perpendicular to that axis. The projected ring is approximately 0.001 inches wide or greater at its focus in the 360° ring.

If an object now intrudes onto this ring 17 the light reflected therefrom is imaged by the lens 14 onto the detector ring 20. The detector ring is small enough in the radial direction that for only a very short time does light from the part 18 image at the detector, namely when that part is at point P on the ring 17. If the part 18 is outside of the lens field no point will exist at all and if it is inside of the ring 17, the light will not image on the detector ring 20.

The light on the detector ring has a nominal value all the way around. There are two ways by which it can sense the reflected light from the ring 17. First, the detector ring can be operated in such a fashion that the light actually intersects the detector ring. Given AC coupling, this will provide an instantaneous rise in the signal on the detector ring which can be sensed.

The other way to operate the detector ring is as follows. Two concentric detector rings can be provided with a "hole" in the middle. In this case the signal received from reflected part 18 will first rise and then drop as the part is at the null point, and then it will rise again on the other side. This can provide better signal processing since the interruption can be detected as a minimum of intensity in a "trough" and threshold is not intensity dependent. Some memory would be required, however, since one deliberately overshoots the null position, this being hard to avoid in any event, given the inertia of the coordinate measuring device.

Whichever type of detector is used, the sensing of the part 18 which has blocked some portion of the light ring can be determined and the accuracy of this is determined by the sensitivity of the detector ring, the magnificational lens system, the fineness of the ring focus, etc. With a one to one imaging system as shown, the accuracy is in the level of 0.001 inches or better in terms of raw resolution.

If a circular photo diode array is used, it can be scanned at a high rate. This provides a much stronger indication of actual contact with the part 18, although it is limited to 40,000 scans per second which is quite high (Retican 69 element array. A particular advantage of a circular diode array is that with it one can easily ascertain where in the 360° ring the interruption has occurred. This data may or may not be apparent from any one contact point from the cartesian coordinate axis of the coordinating measuring device.

FIG. 2(a) and 2(b), collectively referred to as FIG. 2, illustrate another embodiment of the present invention, namely a simplified embodiment including a means for contacting the part.

In FIG. 2 a lens 40 such as a Selfoc fiber lens has mounted at the lower end thereof a disc 41, the disc being capable of movement in any direction within its plane. The disc is circular and the outer periphery thereof defines the reference circle. The disc is held in place by a spring 44. It includes an aperture 42 in the center thereof. A light 43 such as an LED light source passes through the aperture 42 and the lens 40. When the disc 41 is centered such that the aperture 42 is also centered, the light from 43 passing through 42 at lens 40 is imaged by lens 46 onto a detector 48. This detection is sensed along line 49 at output circuitry 50.

If the disc is moved off of center by virtue of contact with a part such as 52, the light shining through aperture 42 is no longer imaged by lens 46 onto a detector 48, and this fact is recorded by the output circuitry 50, thereby reflecting the fact that the ring originally defined by the periphery of disc 41 has been interrupted by an object.

Although the invention has been described in considerable detail with respect to preferred embodiments thereof, it will be apparent that the invention is capable of numerous modifications and variations apparent to those skilled in the art, without departing from the spirit and scope of the invention.

FIG. 3 illustrates another embodiment of the contacting invention shown in FIG. 2. In this case, however, it is not simply the presence of the surface that is detected but its actual location within a very small measuring range about the center axis of the probe. A much more sophisticated scanning detector is utilized to accomplish this purpose.

The second thing about the FIG. 3 application is that it illustrates a 3 axis (x, y, z) measuring probe rather than simply a 2 axis xy probe as in FIG. 2.

Let us consider the figure. In this case, a ball contact is utilized which upon contact can deflect in any of the three axes. This ball contact 60 is free to move vertically up and down the z axis of shaft 62. As before, a disk 61 with a center hole is utilized together with a light emitting diode or other light source, 63. It is noted that the light source could be simply a mirror with a light or other reflective surface source remote in the probe housing 64. A suitable source can also be remoted with fiber optics or whatever.

As in FIG. 2 xy movement of the ball is also possible of over a small range as well, moving the disk back and forth. It is noted that in this particular instance, the ball moves with the shaft 62 and the housing 64 fixed. It is also however feasible to construct this with the ball fixed rigidly to the shaft in the z axis and with the shaft 62 and ball 61 moving in unison in the z axis. This however does not have the x axis sensitivity of the one shown as will be described.

The lens in this case 65 is a selfoc rod lens with a very short focal length. It forms an image with the help of relay lens 70 onto matrix diode array 71 which can scan in two axes. This is read out by microcomputer 74.

An additional construction detail is the optional breakaway mounts 75 which allow the ball to hit causing the probe to overtravel and then return to its original position. It is noted that if the probe is only used to establish the point of contact, its return to exactly the same position is not persé required, since it can be rezeroed instantly to the new position, whatever it is.

One additional feature of this, also shared by the FIG. 2 device, is that, unlike previous probes such as the Reneshaw "touchfire" probe, this device can actually take data on coordinates of a part such as the nose tip of a tool for example, without requiring the coordinate measuring machine to do all of the "hunt and peck" motions that are normally required. This is because the image of the hole can be seen over a small range on the matrix array surface, and therefore the surface of the ball tracked continuously by the sensor itself, at least within this range.

Consider the inset figure showing a blown-up view of the matrix array surface 76. Image 77 is that of a image at the correct focus in the z axis indicative of the furthermost extension of the ball in the z axis. It's a well focussed spot and, in this case however, is shown to be also contacting in the xy plane so as to move the spot from the nominal centerline of the matrix array in both x and y at a 45° vector. The spot 78 is much enlarged from that of 77 and is indicative of the most upward (and thus most out of focus) vertical travel of the ball in the z axis. Scanning of the diameters of the spots gives the z axis location. Naturally just a change in diameter indicates the presence of the surface or contact.

In the 78 spot case, it is seen that it is moved to the opposite side also at a vector of 45° in the xy plane. All of these spot sized and xy vectors are obtainable from the matrix array using circuitry such as shown in varius copending applications by the author and others, such as New Photo Detector Array Based Measurement Systems. Again the images 77 and 78 are of the hole 61 in the disk at different z locations. The fact that the image changes in z is because the lens is rigidly mounted to the shaft on which the disk moves vertically thereby changing the focus drastically since it is a very short focal length lens 65.

The actual constructional details of the ball in terms of the way in which it slides up and down the shaft and also side to side is not shown here for clarity. Any suitable means to accomplish reasonable freedom of movement in the 3 axes is suitable. Naturally such movements would normally be elastic to allow them to return to original nominal position. Magnetic and pneumatic forces can also be used for this purpose.

Figure 4A:
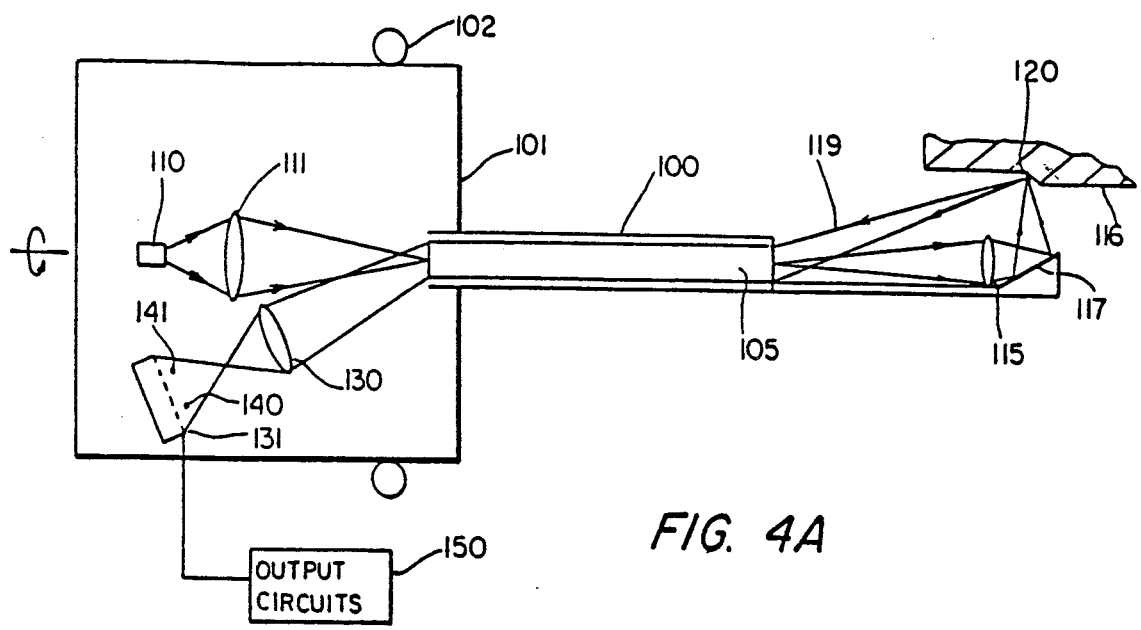

FIG. 4 illustrates another non-contact embodiment of the invention. As shown, a shaft 100 mounted to a housing 101 which is rotatable about the center of the shaft axis on bearings 102.

Within the shaft is a lens, in this case, a "Selfoc" rod lens 105, with a wide angle (e.g. 55°) field of view. In the particular arrangement shown, a semi conducting diode laser, in this case, the new visible type 110, illuminates distal end of the selfoc end with light via focus collection lens 111 which is optional. The light emerging from the other end of the rod lens is collected by auxiliary lens 115 and focussed onto the part surface 116 through the use of mirror 117. Generally speaking, the lens and mirror are enclosed by a housing at least on 3 of their 4 sides but in this case, only one side is shown closed for clarity.

Light 119 from the focal point on the surface 120 is collected again by the front surface of the rod lens, since it is within the acceptance angle of the lens 130. It is then imaged, in this case, by lens at the other end onto a linear photo diode array, 131. It is noted that lens 130 may also be central to the rod lens with the light brought in from laser 110 via beam splitter as will be shown in FIG. 4B.

As the part 116 moves closer to the probe thereby decreasing the included angle between the surface and the probe axis, the spot image 140 moves on the diode array, for example to a new position 141. It is noted that the exact direction of movement on 141 is a function of the probe design and that lens, focal lengths, etc. chosen. The distance moved on the diode array can be detected via output circuits 150 and the position of the surface of 116 determined.

To ensure that a surface 360° can be obtained, the total probe housing 101 and shafts area 100 and all are mounted so as to be rotatable to provide a 360° sweep.

The triangulation principles are herein have been discussed at great length in a copending application entitled "Method and Apparatus for Electro-optically Determining the Dimension, Location and Attitude". The light has gone down the same path and returned via the same path. In the FIG. 4B example, a somewhat similar arrangement with two differing light-paths is illustrated. In this case, the light to illuminate the part is brought in at an angle, in this case, being furnished by diode laser 200 focussed by lens 201 into fiber 202 whose output is then focussed by lens 203 into spot image 204 on the surface of the part 205, which in this case is a cutting tool insert on a boring bar 206.

Light from the part is deviated by mirror 207 and collected by selfoc rod lens 208 in housing 210. It is noted here too that the angular cone return from the spot is easily within the range of the rod lens.

The output of the rod lens is in turn relayed by lens 215 and imaged onto detector array 220. 221 illustrates the spot image on the detector array which in turn can be scanned out. screen. A matrix diode array which can scan in 2 axes can be used and its output is shown on the TV screen 230 for illustration purposes. Normally, however, all spot positional data is computed, with no visual presentation persé.

In this version, another type of illumination is also shown for additional surface and feature identification. In this case a continuous or flashed lamp 240 is used to illuminate the end of a fiber bundle 250 whose fibers indeed can circle the selfoc lens as well as lens and other fiber 202 if desired. Light from bundle 250 also can hit mirror 207 and illuminate the part with general broad illumination rather than the spot provided by lens 203.

Since the matrix array system can also form an image using the broad illumination, this image is of the part surface itself and gray scale form which can be digitized. Such an image is shown of the cutting tool insert edge area 260 displayed on the screen 230.

The advantage of doing this is that analysis can indicate where the probe is relative to any part and the range be found by the triangulation system shown. In other words, the probe has multiple capacities within it. Again, like the FIG. 4A version, to obtain a 360° scan, the whole probe has to be rotated.

Figure 5:
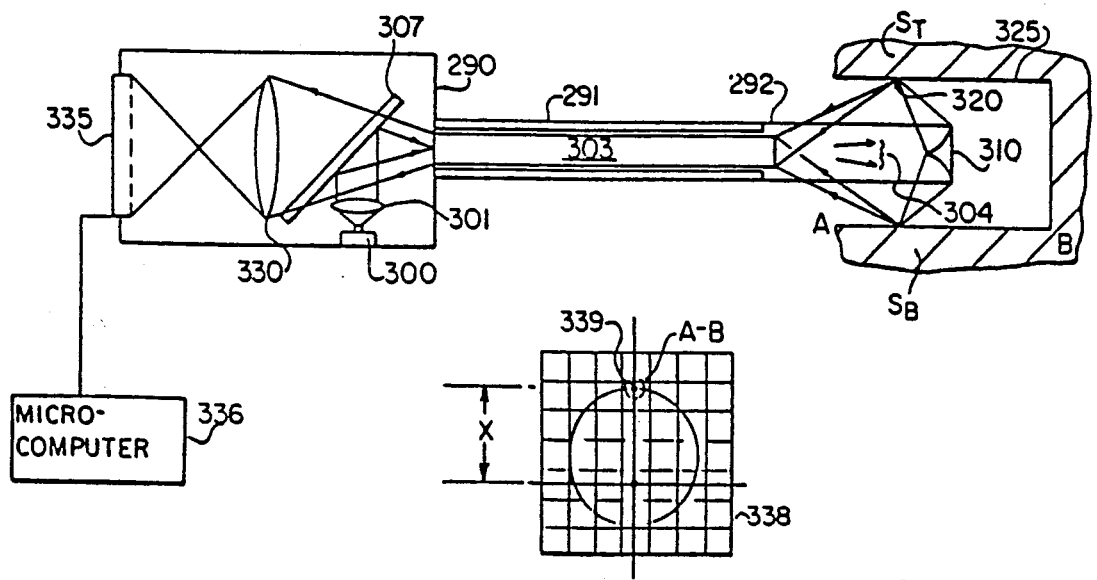
Figure 4B:
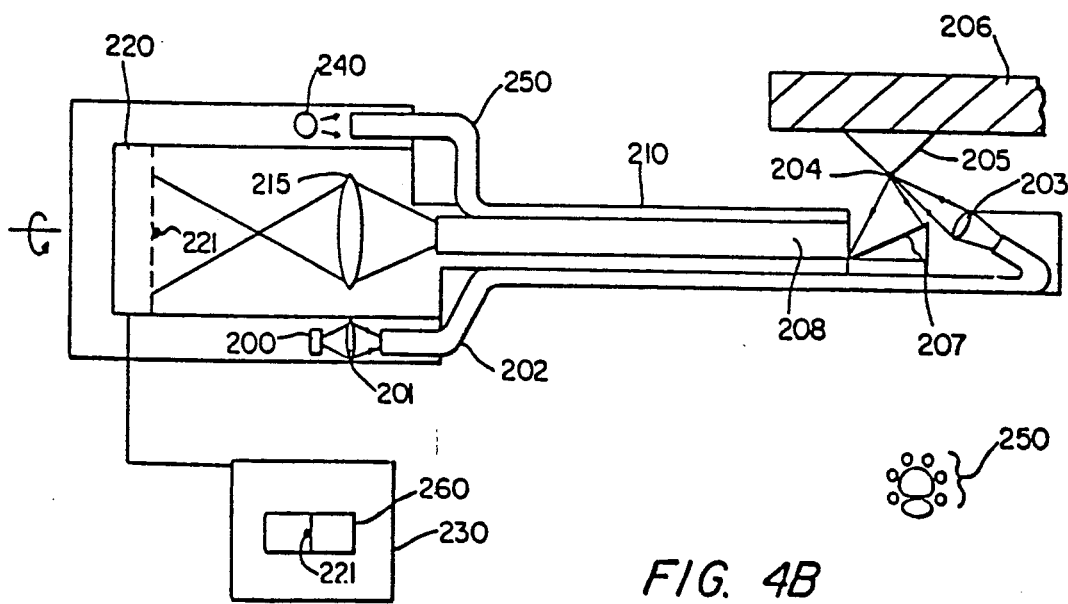

FIG. 5 illustrates another non-contact version of the invention similar to FIG. 4B in certain respects while also being similar to FIG. 13 in a copending application "Method and Apparatus for Determining Physical Characteristics of Object and Object Surfaces". Housing 290 is provided with shaft 291 which is either transparent or at least has the end section 292 transparent such that light can pass through it. Suitable transparent members would be glass and plastic, for example.

Light inputs the system from diode laser or for that matter external gas laser 300 focussed by lens 301 via beam splitter 302 into selfoc rod lens 303. Emerging light 304 from the rod lens is redirected and focussed by paraboloid of revolution mirror 310 to provide a continuous annular ring spot on the surface which is represented by 320 on surface 325, in this or a drilled hole. It is noted that since the probe is closer to the surface of the hole $S_B$, than the opposite surface 'B' $S_T$, the spot is further forward on $S_B$ than $S_T$.

In any case the selfoc rod lens through its wide aperture, collects the light that has been projected onto the surface on the angular focussed ring from all 360° at once and via lens 330, this light is focussed onto, in this case, a two axis scanning diode array such as a matrix diode array 335. This diode array is read out by microcomputer analysis system 336 and a typical trace is shown on screen 338.

Since the part surface is a cylindrical hole, a quasi circular ring is detected. This ring is however shifted from the centerline by the same amount as the probe was shifted in the hole thereby indicative of the fact that the probe is not coaxial with the hole. Naturally if the surface was not round, neither would be the return imaged ring.

Obviously one other use of this is to find where a single portion of a surface is in space much as the FIG. 1 example. For example, suppose only the section from A to B of this surface was present in one plane. In this case, only the point 339 representing the image of the light ring intersection with the surface AB would appear and this would indicate that we had indeed contacted a surface and it was the distance away represented by that image point from the probe axis. This is desirable information that can be fed back to the coordinate axis of the coordinate measuring machine or for that matter, machine tool on which this probe is located. The location of AB from the centerline of the probe which in this case is a distance x, gives the answer as to where the surface is. In this case, the distance y is equal to zero because it lies on the x centerline of the probe.

Figure 6:
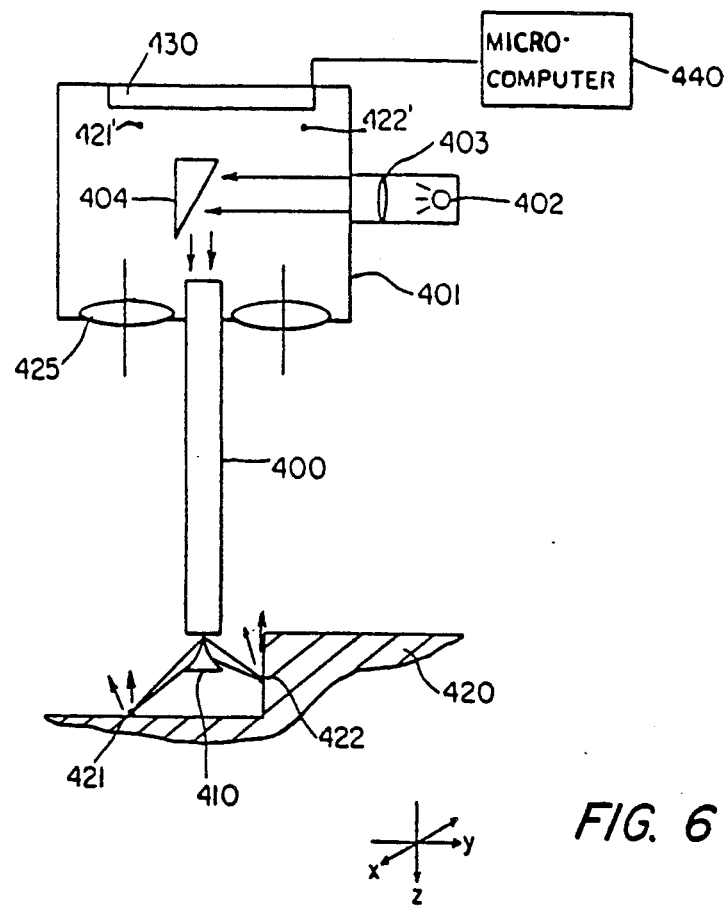

Another version of this probe, similar to that of FIG. 1 and 4 in many respects is shown in FIG. 6. It illustrates the use of both x and z axis measurement simultaneously, using a matrix diode array (as opposed to a circular array which indicate presence of the surface only). Further illustrated is a axicon or torodial lens as opposed to a normal lens. All these features are not necessarily required together and can be utilized with the other embodiments as well where feasible.

As shown in the figure, a probe contains a hollow shaft 400 mounted to a housing 401. In this case, light from a light source 402 (in this case a halogen lamp, collimated by lens 403) hits mirror 404 which directs it down the shaft. A paraboloid of revolution type mirror 410 redirects the light and focusses it out forward of the end of the probe as shown to form an anular ring spot as was just described relative to FIG. 5. Since the annvollar ring is projected at an oblique angle to the probe axis, its point of intersection with a part surface has both the z component in the vertical axis of the probe, and an xy component as well since it extends 360° around the center or z axis of the probe.

In this case, the angular ring is shown hitting a part 420 at two points on its surface, 421 and 422. Light is collected by axicon lens 425 which forms an image onto matrix photodiode array 430 which is read out by microcomputer 440. In this particular lens case, however, at any one section the lens simply acts like a simple cylinder lens, and therefore in actuality, it is a cylinder lens with a 360° symmetry. Therefore, the images of the spots 421 and 422 stay separated, 421' being the image of 421, 422' being the image of 422. Naturally any other kind of array is also feasible for this but suitable processing circuitry to read it out in a circular fashion as is also desirable in FIG. 5 has been shown in a copending application entitled "New Photo Detector Array Based Measurement Systems".

The interesting thing about this is not only the novel components, but the fact that we are actually seeing in 3 axes simultaneously. For example, where the surface part 420 where it is intersected by the point of annulus 421 is facing purely in the z axis whereas the part intersected by the other side of the annulus making spot 422 is facing purely in the y axis. Both of these zones are detected. Other than obvious light intensity differences which would happen in this particular example, (i.e. spot image 421' would in general be much brighter than that of 422' given the angles of incidence and collection by lens 425), there is no real way to tell which direction the surface of the part lies 420 is. This can, however, be determined by moving the probe on the coordinate axis of the coordinate measuring machine. In other words, if the probe is moved vertically in the z axis, it is obvious that the position of image 421' will change greatly on the photo detector array but 422' will stay fixed. This immediately tells in which direction the respective surfaces are facing. Obviously, compound directions require either compound probe movements or suitable signal vector processing.

The ambiguity of which way the direction of the surface faces is often removed, because one knows the part that one is inspecting in general and it is only the differences in where the surfaces lie relative to where they're supposed to lie that matter. In other words, most surfaces can never be substantially out in which direction they point. For example, as the probe was moved toward the part in the z axis, one would know that one was to pick up the 421 surface in the z axis and then at that point slew to the right with the probe in order to pick up the surface point 422. In this case, operation is simple and we have a true 3 axis non-contact measuring probe.

Figure 7:
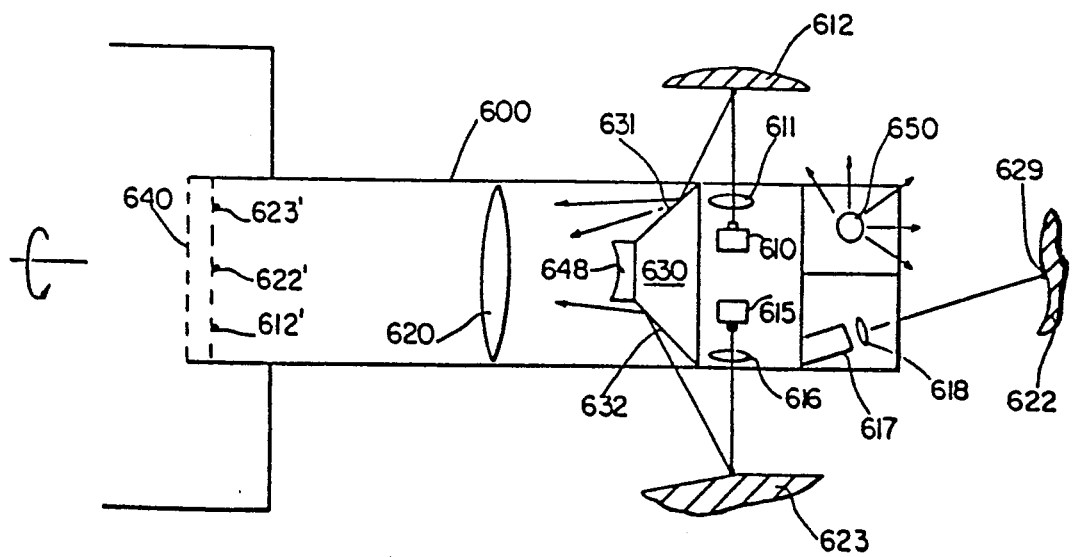

FIG. 7 illustrates another embodiment of the invention this time with separate light sources or fiber remoted ends thereof located down in the probe. As shown, the probe body 600 contains a light source, in this case a 610 diode laser, imaged by lens 611 onto the part surface 612 (if present). Similarly, diode laser 615 is imaged by lens 616 onto surface 623 (if present) and diode laser 617 is imaged by lens 618 on to surface 622 (if present). In this manner, 3 different axes are measured simultaneously.

A single lens 620 collects the light from a necessary included angle from all spots made with the surface 612 shown in all cases. This collection is done via prism 630 which has reflecting faces 631 and 632 as well as transmitting zone in the center to collect back the light from the spot 629 produced by lens 618. In this case, an auxiliary lens 648 for the center axis is utilized to make the images from the different spots fall in the same area. All 3 spots are focused by lens onto the diode array to form images 612', 622' and 623' on the diode array 640. Readout of these positions gives the answer for all three spots. Naturally, the probe can also be rotated about its axis to make a 360° sweep.

As in FIG. 4B, auxilliary lighting can be provided as well in this particular example, in this case, by light source 650 which is shown illuminating surfaces 612 and 622 (all windows are not shown in this and other diagrams for clarity but it is noted that generally glass windows would seal the probe from the outside). This light source 650 could desirably be flashed so it would not interfere with the light spots produced normally, but when a gray scale image of the surface was desired on the array, it could be used but have a brief instantaneous high peak value. For use in these cases, diode array 640 ideally would be a matrix array which could scan the images of the surfaces in two axes.

While visible light is preferred, it is understood that the word 'light' and 'optical' in the context of this invention encompasses all electro-magnetic radiation wavelengths X-ray to infra red.

It should also be noted that the detector 48 of FIG. 2 or detector 78 of FIG. 3 may be an analog position sensing detector, such as the UDT SC-10. This detector gives x and y voltage signals proportional to the deviation of the image spot such as 47 from the center of the detector. Using this detector 2 axis position information of the disc can be determined similar to that obtainable with the matrix array 71, but in analog rather than digital form.

It is also noted that the disc 41 in FIG. 2 or 61 in FIG. 3, may be a member not necessarily round on its outside (e.g. triangular) and not necessarily with a hole used for disc position monitoring. For example, consider the use of reticle rather than a hole such as 55, in 4 point contact member 56 in FIG. 2. The x-y coordinates of the reticle could be monitored easily with the matrix array 71 of FIG. 3. Indeed it would go out of focus with z changes, just as does the hole of disc 61 in FIG. 3 too, and these could be monitored. Indeed tilts can be monitored if one side of the reticle goes out of focus more than another.

I claim:

1. An apparatus for optically sensing the presence of an object at a predetermined point along a line extending from a reference axis comprising:

a light directing means for directing a light beam outwardly from adjacent the reference axis along the line whereby a spot of light is formed on the object where the object is located along the line at the predetermined point;

a light detector means for detecting a spot of light imaged thereon;

an image forming means for forming an image of the spot of light on said light detector means only when the spot of light is formed on the object at the predetermined point from the reference axis; and a presence detecting means for detecting the presence of the image of the spot of light on said light detector means and for indicating the presence of the object at the predetermined point along the line.

2. An apparatus as claimed in claim 1 wherein said light directing means includes a means for focusing the light on the point of the line.

3. An apparatus as claimed in claim 1 wherein said light directing means is a laser.

4. An apparatus as claimed in claim 1 wherein said light directing means includes a means for rotating the light beam about the reference axis such that the presence of the object is determined along a circle defined by the rotation of the point on the line about the reference axis.

5. An apparatus for optically sensing the location of an object along a line extending from a reference axis comprising:
   a light directing means for directing a light beam outwardly from adjacent the reference axis along the line whereby a spot of light is formed on the object only when a surface of the object is present along the line;
   a light detector means for detecting a spot of light imaged thereon;
   an image forming means for an image of the spot of light on said light detector means when the spot of light formed on the surface of the object is within a predetermined range from the reference axis along the line; and
   a location detecting means for detecting the location of the image of the spot of light on said light detector means and for indicating the location of the object at a distance from the reference axis along the line.

6. An apparatus as claimed in claim 5 wherein said light detector means is a detector array having a plurality of discrete light sensitive elements, and wherein said location detecting means includes a means for interrogating said elements to determine the position of the image on the detector array and hence the distance of the object from the reference axis.

7. An apparatus as claimed in claim 5 wherein said light directing means is a laser.

8. An apparatus as claimed in claim 5 wherein said light detecting means includes a means for focusing the light to a point on the line within the predetermined range.

9. An apparatus as claimed in claim 5 wherein said light directing means includes a means for rotating the light beam about the reference axis such that the location of the object is determined along a circle defined by the rotation of the point on the line about the reference axis.

10. An apparatus as claimed in claim 5 further including a broad illuminating means for illuminating the object about the spot of light; wherein said image forming means further forms a broad image of the object illuminated by said broad illumination means on said light detector means; and further including a display means for displaying the image of the spot and the broad image formed on said light detector means.

11. An apparatus as claimed in claim 5 and further including a second light directing means for directing a light beam along a second line whereby a second spot of light is formed and imaged on the object when a surface of the object is present along the second line; and wherein said location detecting means further detects the location of a second image on said light detector means and indicates the location of the object at a distance from the reference axis along the second line.

12. An apparatus for determining the circularity of a cavity or the location of a reference axis relative to a center of cavity comprising:
   a light directing means for directing a light beam simultaneously 360° outwardly from a reference axis whereby a ring of light is formed on the surface of the concavity;
   a light detector means for detecting a ring of light imaged thereon;
   an image forming means for forming an image of the ring of light on said light detector means when the ring of light formed on the surface of the concavity is within a predetermined range from the reference axis; and
   a location detecting means for detecting the location of the image ring of light on said light detector means and hence the circularity of the imaged ring of light or a distance of a center of said light detector means corresponding optically with the reference axis from the imaged ring of light.

13. An apparatus for determining the location in three dimensions of a surface of an object comprising:
   a light directing means for directing a light beam in a predetermined angular conical pattern from a reference point whereby a zone of light is formed on the surface of the object;
   a light detector means for detecting in two dimensions a zone of light imaged thereon;
   an image forming means for forming an image of the zone of light on said light detector means when the zone of light formed on the surface of the object is within a predetermined range;
   a location detecting means for detecting the location of the imaged ring of light on said light detector means in two dimensions; and
   a determining means for determining the location of the surface of the object in three dimensions from the detected two dimensional position of the imaged zone of light.

14. An apparatus as claimed in claim 13 wherein said light directing means is movable in at least one direction; and further including a plane determining means for determining a change of position of the imaged zone of light on said light detector means as said light director means is moved in one direction and hence the change of position of the surface of the object forming a plane.

15. An apparatus as claimed in claim 14 wherein the surface of the object includes a predetermined first plane portion and a predetermined second plane portion adjacent to and at an angle to the first plane portion; and wherein said plane determining means also determines the location of the second plane portion by an abrupt change in the imaged zone of light on said light detector means as said light director means is moved adjacent the first plane portion toward the second plane portion.

16. A method for determining the exact location of a first planar surface located at a predetermined angle to a second planar surface comprising the steps of:
   directing a light beam outwardly and away from an end of a probe in a predetermined angular conical pattern whereby a zone of light is formed on the second surface of the object;
   moving the end of the probe from a predetermined position toward the second planar surface;
   imaging the zone of light on the second planar surface on a light detector when the second surface is within a predetermined range from the end of the probe;
   stopping the movement of the end of the probe toward the second surface when the zone of light on the second surface is detected by the light detector;

moving the end of the probe toward the first surface and parallel to the second surface;

imaging the zone of the light on the first surface on the light detector when the first surface is within a predetermined range from the end of the probe;

stopping the movement of the end of the probe toward the first surface when the zone of light on the first surface is detected by the light detector; and determining the position of the end of the probe and the position of the first surface relative to the end of the probe whereby the exact position of the first surface is known.

17. Apparatus for optically sensing the presence or location of an object comprising:

means for directing light along an axis such that a zone of light is formed on a surface of an object located in the path of said directed light;

light detector means; and means for forming an image of said zone of light on said light detector means, said light detector means being constructed and arranged such that said image is formed thereon only when a surface of an object is located at pre-determined position in said light path, whereby the presence or location of said object at said pre-determined position in said light path is indicated by the presence of said image on said light detector means; and means for detecting the presence of said image.

* * * * *